(12) United States Patent
Nagasaka

(10) Patent No.: US 8,830,190 B2
(45) Date of Patent: *Sep. 9, 2014

(54) DISPLAY DEVICE, DISPLAY METHOD, AND DISPLAY PROGRAM

(75) Inventor: Hidenori Nagasaka, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 187 days.

This patent is subject to a terminal disclaimer.

(21) Appl. No.: 13/271,758

(22) Filed: Oct. 12, 2011

(65) Prior Publication Data

US 2012/0098770 A1    Apr. 26, 2012

(30) Foreign Application Priority Data

Oct. 25, 2010   (JP) ................................. 2010-239113

(51) Int. Cl.
| | | |
|---|---|---|
| *G06F 3/041* | (2006.01) | |
| *G06F 3/0485* | (2013.01) | |
| *G06F 3/0488* | (2013.01) | |
| *G01C 21/36* | (2006.01) | |

(52) U.S. Cl.
CPC .......... *G01C 21/3664* (2013.01); *G06F 3/0485* (2013.01); *G06F 3/0488* (2013.01)
USPC ....................................... 345/173; 178/18.01

(58) Field of Classification Search
USPC ...................... 345/173–179; 178/18.01–18.09
See application file for complete search history.

(56) References Cited

U.S. PATENT DOCUMENTS

| | | | |
|---|---|---|---|
| 6,285,347 B1 * | 9/2001 | Watanabe et al. ............. | 345/684 |
| 6,747,680 B1 | 6/2004 | Igarashi et al. | |
| 8,075,401 B2 | 12/2011 | Miyamoto et al. | |
| 8,209,635 B2 | 6/2012 | Thom | |
| 2003/0122787 A1 | 7/2003 | Zimmerman et al. | |
| 2007/0146337 A1 | 6/2007 | Ording et al. | |
| 2008/0231610 A1 * | 9/2008 | Hotelling et al. ............. | 345/173 |
| 2008/0306683 A1 * | 12/2008 | Ando et al. .................... | 701/207 |
| 2009/0278808 A1 * | 11/2009 | Akiyama ....................... | 345/173 |
| 2010/0235794 A1 | 9/2010 | Ording | |
| 2010/0241976 A1 | 9/2010 | Nozaki et al. | |

(Continued)

FOREIGN PATENT DOCUMENTS

| | | |
|---|---|---|
| JP | A-63-206827 | 8/1988 |
| JP | A-10-161628 | 6/1998 |

(Continued)

OTHER PUBLICATIONS

Japanese Patent Office, Notification of Reason(s) for Refusal mailed Oct. 1, 2013 in Japanese Patent Application No. 2010-239113 w/Partial English-language Translation.

(Continued)

*Primary Examiner* — Premal Patel
(74) *Attorney, Agent, or Firm* — Oliff PLC

(57) ABSTRACT

Display devices, methods, and programs display an image on a touch panel. The devices, methods, and programs detect a start position, which is a detected position where a user's finger starts to contact the touch panel, calculate a moving amount by multiplying a distance between the detected start position and a detected second position of the user's finger by a predetermined coefficient of less than one, and update the display position of the image in a direction moving from the detected start position toward the detected second position until the moving amount is equal to or less than a minimum moving amount.

15 Claims, 4 Drawing Sheets

(56) References Cited

U.S. PATENT DOCUMENTS

| | | |
|---|---|---|
| 2011/0032197 A1 | 2/2011 | Iida |
| 2011/0163874 A1 | 7/2011 | van Os |
| 2011/0202834 A1 | 8/2011 | Mandryk et al. |
| 2011/0302532 A1 | 12/2011 | Missig |
| 2012/0098770 A1 | 4/2012 | Nagasaka |

FOREIGN PATENT DOCUMENTS

| | | |
|---|---|---|
| JP | A-2002-033795 | 1/2002 |
| JP | A-2008-304325 | 12/2008 |
| JP | A-2009-276819 | 11/2009 |
| WO | WO 01/29702 A2 | 4/2001 |

OTHER PUBLICATIONS

Nov. 24, 2013 Office Action issued in Application No. 13/270,755.
Sep. 10, 2013 European Search Report issued in EP Application 11 18 4691.
U.S. Appl. No. 13/270,755.
Japanese Patent Office, Notification of Reason(s) for Refusal mailed on Oct. 22, 2013 in Japanese Patent Application No. 2010-239576 w/Partial English-language Translation.

* cited by examiner

DISPLAY DEVICE, DISPLAY METHOD, AND DISPLAY PROGRAM

INCORPORATION BY REFERENCE

The disclosure of Japanese Patent Application No. 2010-239113, filed on Oct. 25, 2010, including the specification, drawings, and abstract is incorporated herein by reference in its entirety.

BACKGROUND

1. Related Technical Fields

Related technical fields include display devices, display methods, and display programs.

2. Related Art

In past car navigation devices and the like, a map shown on a display is scrolled up, down, left, or right, and a list shown on the display is scrolled in a specific direction. Operational input for thus scrolling information shown on the display includes operational input using a touch panel or a joystick, for example.

A proposed scroll control device of a screen (see Japanese Patent Application Publication No. JP-A-H10-161628, for example) performs a control that scrolls a display screen by a vector based on a change vector of an input coordinate while coordinate input is performed by a coordinate input part using a touch panel, and scrolls the display screen when the coordinate input is stopped by a vector based on a change vector of an input coordinate just before coordinate input is stopped.

SUMMARY

However, according to the device of the related art described above, when the user moves his or her finger on the touch panel (performs a so-called dragging operation) to scroll an image such as a map or the like, the image is scrolled so as to match the finger movement. Therefore, the image displayed directly under the finger may remain constantly hidden under the finger and have poor visibility.

Exemplary implementations of the broad inventive principles described herein provide a display device, a display method, and a display program, which can suppress continued hiding of a specific portion of a displayed image by a finger, and improve visibility.

Exemplary implementations provide a display device, a display, method and a display program, wherein, for example, using a value that multiplies a distance between a position on a display unit that corresponds to a position on an image corresponding to a contact start position of a user's finger detected by a position detection unit and a position on the display unit that corresponds to a detected position of the user's finger detected by the position detection unit by a predetermined coefficient of less than one as a moving amount of a display position of the image, the display position of the image is updated in a direction moving from the position on the display unit that corresponds to the position on the image corresponding to the contact start position toward the position on the display unit that corresponds to the detected position of the user's finger detected by the position detection unit in a predetermined cycle until the moving amount is equal to or less than a minimum moving amount. Therefore, the image display position can be updated so as to track in a delayed manner the movement of the user's finger contacting a touch panel. It is thus possible to suppress continued hiding of a specific portion of the displayed image by the user's finger, and improve visibility.

According to exemplary implementations, if a moving direction of the display position of the image is limited to a specific direction by the display control unit, the display control unit calculates the moving amount based on a distance of a component of the specific direction between the position on the display unit that corresponds to the position on the image corresponding to the contact start position and the position on the display unit that corresponds to the detected position of the user's finger detected by the position detection unit. Thus, even if the image is scrolled in only the specific direction, it is possible to suppress continued hiding of a specific portion of the displayed image by the user's finger, and improve visibility.

According to exemplary implementations, the image may be a list formed of a plurality of items. In such case, the minimum moving amount is a display width or a display height per list item. It is thus possible to prevent the movement of the list stopping with list items cut off at end portions of a display unit.

According to exemplary implementations, if the image is a map, the display control unit sets the predetermined coefficient to a value that varies depending on a scale of the map. Therefore, the degree of delay with which the map movement tracks the movement of the user's finger can be adjusted depending on the scale of the map, and visibility further improved. For example, when displaying a wide area map with a high density of display information such as location names and facility names, the map can be moved relatively slowly with respect to the movement of the user's finger. Conversely, when displaying a detailed map with a low density of display information such as location names and facility names, the map can be moved relatively quickly with respect to the movement of the user's finger.

BRIEF DESCRIPTION OF THE DRAWINGS

FIGS. 3A and 3B are diagrams that illustrate an example of a map displayed on a display, wherein FIG. 3A is a diagram that shows a user's finger starting to contact a touch panel, and FIG. 3B is a diagram that shows the user's finger moving while in contact with the touch panel; and FIGS. 4A and 4B are diagrams that illustrate an example of a list formed of a plurality of items displayed on a display, wherein FIG. 4A is a diagram that shows a user's finger starting to contact a touch panel, and FIG. 4B is a diagram that shows the user's finger moving while in contact with the touch panel.

DETAILED DESCRIPTION OF EXAMPLES

Hereinafter, an example of a display device, a display method, and a display program will be described in detail with reference to the drawings.

I. Constitution

Figure 1:
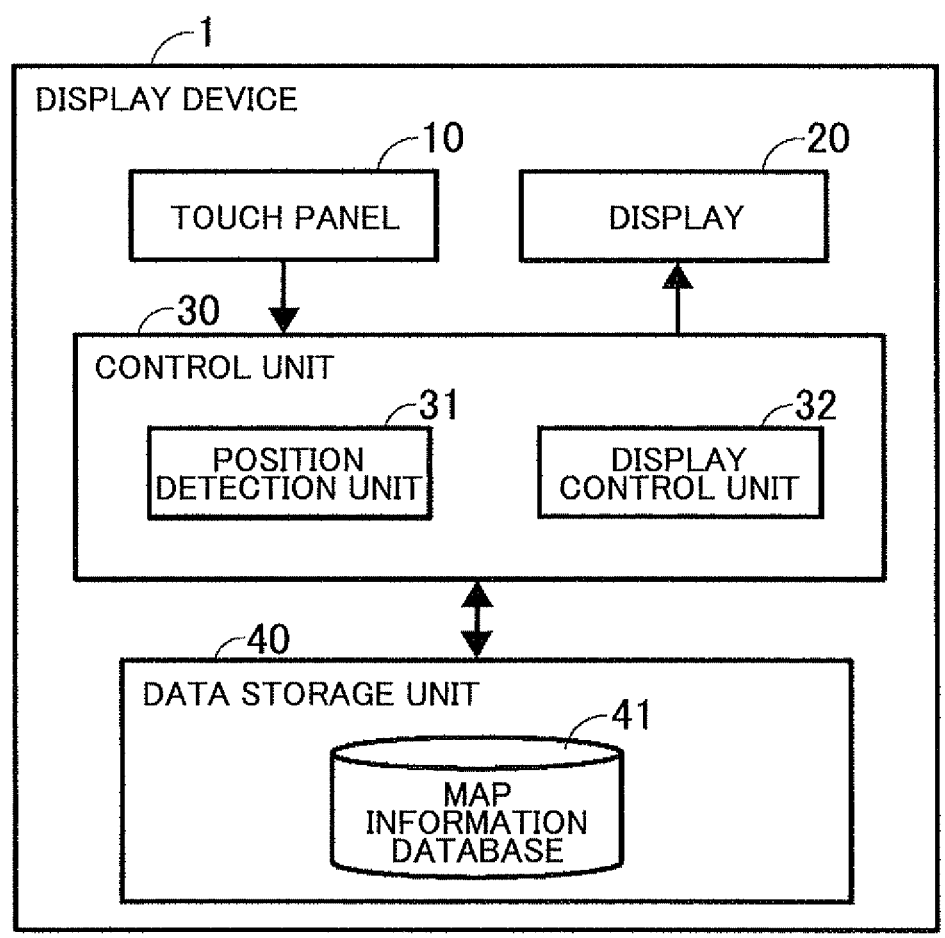
FIG. 1 is a block diagram that illustrates a display device according to an example.

First, the constitution of the display device according to an example will be described. FIG. 1 is a block diagram that illustrates the display device according to a first example. As shown in FIG. 1, a display device 1 includes a touch panel 10, a display 20, a controller (e.g., control unit 30), and a data storage unit 40.

A. Touch Panel

The touch panel 10 is an input unit that, through pressure from a user's finger or the like, accepts various types of operations that include operational input for moving an image displayed on the display 20. The touch panel 10 is formed transparent or semi-transparent and provided overlapping with a display screen of the display 20 on the front of the display 20. A commonly known touch panel that includes an operation position detection unit based on a resistive film, capacitance, or other system may be used as the touch panel 10.

B. Display

The display 20 is a display unit that displays images based on a control of the control unit 30. Note that the specific constitution of the display 20 may take on any form, and a flat panel display such as a commonly known liquid crystal display or organic EL display may be used.

C. Control Unit

The control unit 30 controls the display device 1. Specifically, the control unit 30 is a computer configured to include a CPU, various programs that are interpreted and executed in the CPU (including an OS and other basic control programs, and application programs that are activated in the OS to carry out specific functions), and an internal memory such as a RAM for storing the programs and various data. In particular, the display program according to the first example is installed in the display device 1 through any storage medium or network, and configures various portions of the control unit 30 in substance.

The control unit 30 includes a position detection unit 31 and a display control unit 32 in terms of functional concept. The position detection unit 31 detects the position of the user's finger contacting the touch panel 10 in a predetermined detection cycle. The display control unit 32 updates the display position of information on the display 20 in a predetermined display cycle. The processes executed by the various portions of the control unit 30 will be described in detail later.

D. Data Storage Unit

The data storage unit 40 is a storage unit that stores programs and various data required for operation of the display device 1, and has a configuration that uses a magnetic storage medium such as a hard disk (not shown) as an external memory device, for example. However, any other storage mediums, including a semiconductor storage medium such as a flash memory or an optical storage medium such as a DVD or Blu-ray disc, can be used in place of or in combination with the hard disk.

The data storage unit 40 includes a map information database 41. (Note that database will be abbreviated to "DB" below.)

The map information DB 41 is a map information storage unit that stores map information. The "map information" is configured to include link data (e.g., link numbers, connection node numbers, road coordinates, road types, number of lanes, travel restrictions), node data (node numbers and coordinates), feature data (e.g., traffic signals, road signs, guard rails, buildings), target feature data (e.g., intersections, stop lines, railroad crossings, curves, ETC toll booths, expressway exits), facility data (e.g., facility locations and facility types), topography data, and map display data for displaying a map on the display 20.

II. Display Control Process

Figure 2:
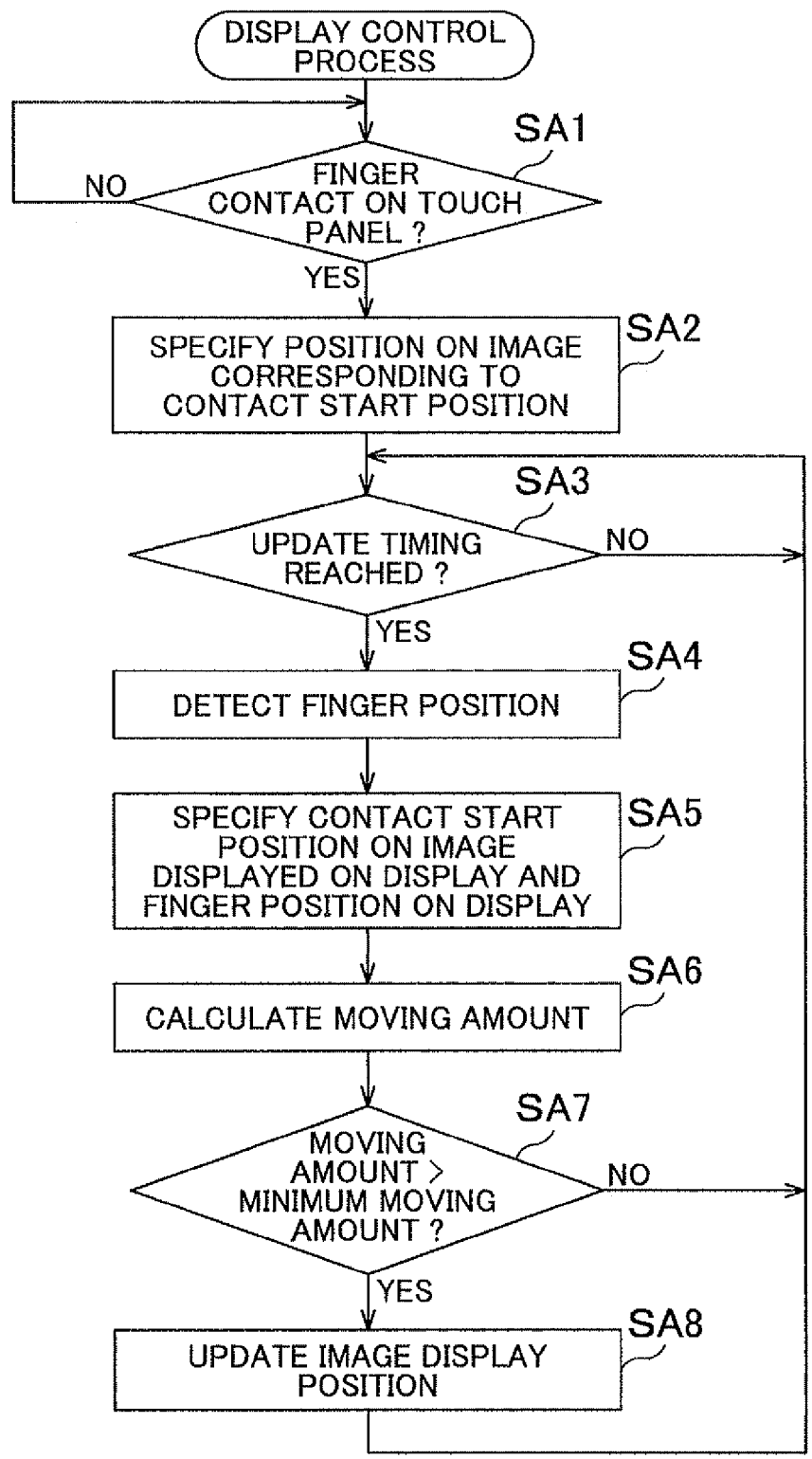
FIG. 2 is a flowchart of a display control process algorithm.

FIG. 2 is a flowchart of the display control process algorithm (steps in the descriptions of each process below are abbreviated to "S"). The exemplary process may be implemented, for example, by one or more components of the above-described display device 1. For example, the exemplary process may be implemented by the control unit 30 executing a computer program based on the algorithm stored in the RAM. However, even though the exemplary structure of the above-described display device 1 may be referenced in the description, it should be appreciated that the structure is exemplary and the exemplary process need not be limited by any of the above-described exemplary structure.

The display control process is activated, for example, after the display device 1 is powered on and an image such as a map or a list is displayed on the display 20.

As shown in FIG. 2, once the display control process is started, the position detection unit 31 stands by until it is determined on the basis of an output from the touch panel 10 that the user's finger contacted the touch panel 10 (SA1: No). If the user's finger contacted the touch panel 10 (SA1: Yes), the position detection unit 31 specifies a position on the image corresponding to a position at which the user's finger starts contacting the touch panel 10 (referred to as a "contact start position" below as appropriate) (SA2). Here, the "position on the image corresponding to the contact start position" refers to the coordinates of the position of the user's finger when the user starts contacting the touch panel 10 in a coordinate system that moves along with the image.

Next, the position detection unit 31 stands by until a timing is reached at which to update the display position of the image displayed on the display 20 (SA3: No). If the timing to update the image display position is reached (SA3: Yes), the position detection unit 31 detects on the basis of an output from the touch panel 10 that a position at which the user's finger (referred to as a "finger position" below as appropriate) is contacting the touch panel 10 (SA4). Note that the timing to update the image display position may be reached in a predetermined cycle (e.g., 20 milliseconds).

Next, the display control unit 32 specifies a position on the display 20 that corresponds to the position on the image corresponding to the contact start position of the user's finger specified at SA2 (referred to as a "position on the image displayed on the display 20" below as appropriate), and a position on the display 20 that corresponds to the detected position of the user's finger detected by the position detection unit 31 at SA4 (referred to as a "finger position on the display 20" below as appropriate) (SA5). Here, the "position on the display 20 that corresponds to the position on the image corresponding to the contact start position of the user's finger specified at SA2" refers to, for example, the coordinates of the position on the image corresponding to the contact start position of the user's finger as specified at SA2 in a coordinate system whose origin is the upper left end of the display 20. In addition, the "position on the display 20 that corresponds to the detected position of the user's finger detected by the position detection unit 31 at SA4" refers to, for example, the coordinates of the finger position detected by the position detection unit 31 at SA4 in a coordinate system whose origin is the upper left end of the display 20.

Next, the display control unit 32 calculates a moving amount of the image display position (SA6). Specifically, the display control unit 32 calculates the moving amount of the image display position as a value that multiples a distance between the position on the image displayed on the display 20 and the finger position on the display 20 specified at SA5 by a predetermined coefficient of less than one (e.g., 0.4).

Note that, if the image displayed on the display 20 is a map, the display control unit 32 may set the predetermined coefficient to a value that varies depending on a scale of the map. For example, a formula that calculates the predetermined coefficient from the map scale may be stored in advance in the data storage unit 40, and the formula used by the display control unit 32 to calculate the predetermined coefficient from the map scale. In such case, for example, a larger map scale (that is, a wider map area displayed on the display 20) results in a smaller predetermined coefficient. Thus, if the map displayed on the display 20 is a wide area map, the moving amount within the map can be decreased. Conversely, if the map displayed on the display 20 is a detail map, the moving amount within the map can be increased. Thus, when displaying a wide area map with a high density of display information such as location names and facility names, the map can be moved relatively slowly with respect to the movement of the user's finger. Conversely, when displaying a detailed map with a low density of display information such as location names and facility names, the map can be moved relatively quickly with respect to the movement of the user's finger.

In addition, if a moving direction of the image display position is limited by the display control unit 32 to a specific direction (e.g., a list formed of a plurality of items is displayed on the display 20, and the moving direction of the image display position is limited to a listing direction of the list items), the display control unit 32 calculates the moving amount of the image display position based on a distance of a component of the specific direction between the position on the image displayed on the display 20 and the finger position on the display 20. In such case, the display control unit 32 calculates the moving amount of the image display position as a value that multiples the distance of the component of the specific direction between the position on the image displayed on the display 20 and the finger position on the display 20 by the predetermined coefficient.

Next, the display control unit 32 determines whether the moving amount calculated at SA6 is greater than a minimum moving amount (SA7). As the minimum moving amount, a minimum unit that an image displayed on the display 20 can be moved (e.g., one dot) may be used, for example.

If the image displayed on the display 20 is a list formed of a plurality of items, the minimum moving amount may be a display width or a display height per list item. In such case, the minimum moving amount is the display width per list item when the list items are listed in a display width direction, and the minimum moving amount is the display height per list item when the list items are listed in a display height direction.

If the determination result at SA7 is that the moving amount calculated at SA6 is not greater than the minimum moving amount (is equal to or less than the minimum moving amount) (SA7: No), the control unit 30 returns to SA3.

However, if the determination result at SA7 is that the moving amount calculated at SA6 is greater than the minimum moving amount (SA7: Yes), the display control unit 32 updates the image display position by moving the image display position in a direction heading from the position on the image displayed on the display 20 toward the finger position on the display 20 by the moving amount calculated at SA6 (SA8). Thereafter, the control unit 30 repeats the processing from SA3 to SA8. Thus, the display position of the image displayed on the display 20 is updated in a predetermined cycle (e.g., 20 milliseconds) by the display control unit 32.

Figure 3A:
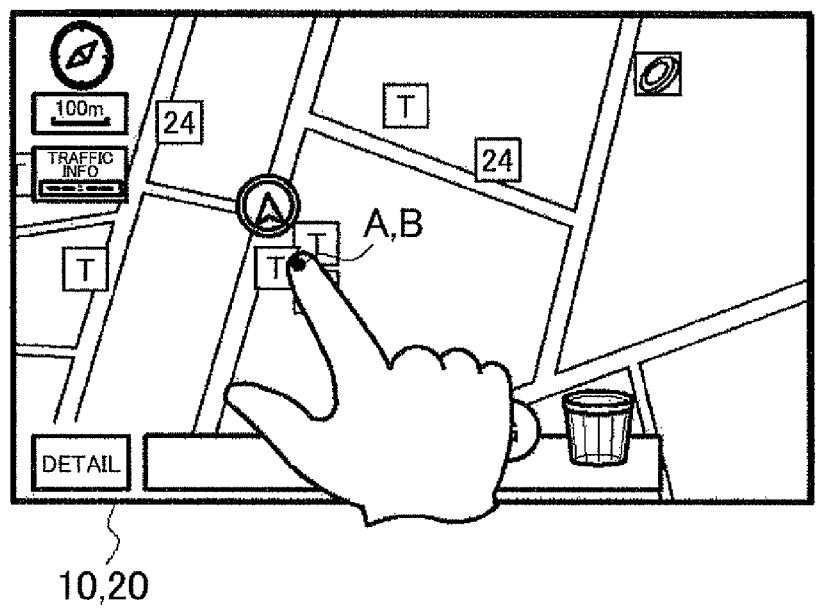
Figure 3B:
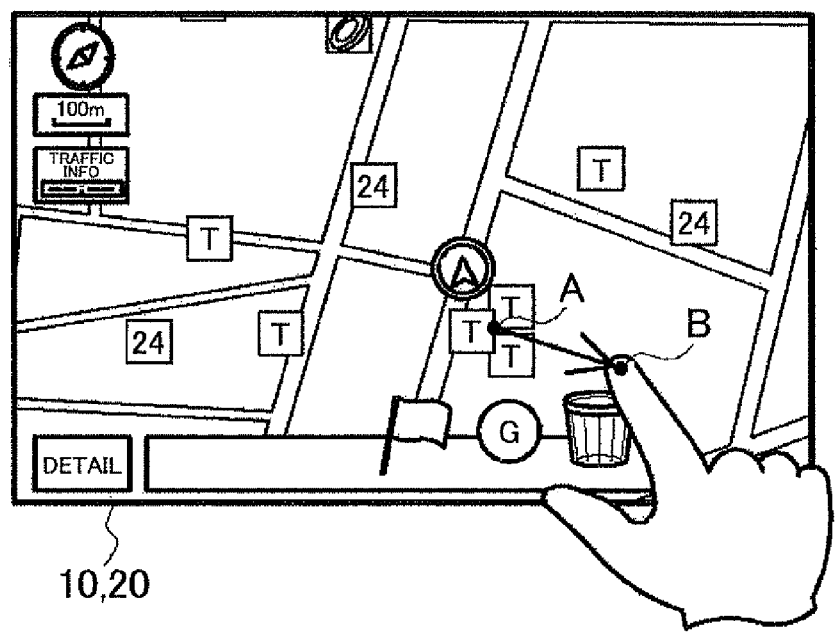

FIGS. 3A and 3B are diagrams that illustrate an example of a map displayed on the display 20, wherein FIG. 3A is a diagram that shows the user's finger starting to contact the touch panel 10, and FIG. 3B is a diagram that shows the user's finger moving while in contact with the touch panel 10 (performing a so-called dragging operation). Based on the display control unit 32 updating the map display position at SA8 in FIG. 2, the map display position is sequentially updated in a direction (indicated by an arrow in FIG. 3B) that heads from a position (A in FIGS. 3A and 3B) on the image displayed on the display 20 toward a finger position (B in FIGS. 3A and 3B) on the display 20. That is, as shown in FIG. 3B, the map display position is updated so as to track in a delayed manner the movement of the user's finger contacting the touch panel 10. In the example of FIGS. 3A and 3B, an icon hidden under the user's finger when the user's finger starts to contact the touch panel 10 (a "T" icon in FIG. 3A) can be made visible by delayed tracking of the movement of the user's finger (a state shown in FIG. 3B).

Figure 4A:
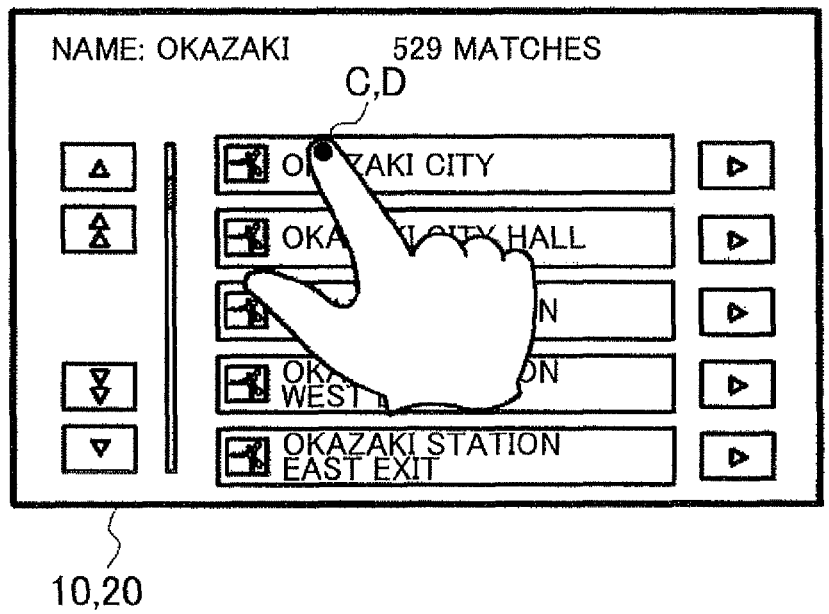
Figure 4B:
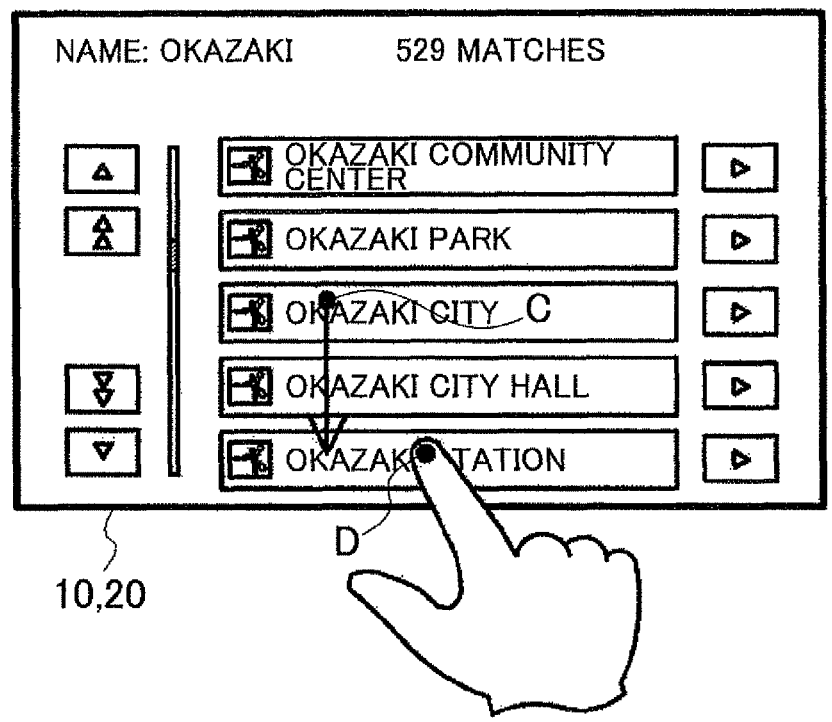

FIGS. 4A and 4B are diagrams that illustrate an example of a list formed of a plurality of items displayed on the display 20, wherein. FIG. 4A is a diagram that shows the user's finger starting to contact the touch panel 10, and FIG. 4B is a diagram that shows the user's finger moving while in contact with the touch panel 10 (performing a so-called dragging operation). Based on the display control unit 32 updating the map display position at SA8 in FIG. 2, the list display position is sequentially updated in line with a component of the specific direction (indicated by an arrow in FIG. 4B) in a direction that heads from a position (C in FIGS. 4A and 4B) on the image displayed on the display 20 toward a finger position (D in FIGS. 4A and 4B) on the display 20. That is, as shown in FIG. 4B, the list display position is updated so as to track in a delayed manner the specific direction component of the movement of the user's finger contacting the touch panel 10. In the example of FIGS. 4A and 4B, a button hidden under the user's finger when the user's finger starts to contact the touch panel 10 (an "Okazaki City" button in FIG. 4A) can be made visible by delayed tracking of the movement of the user's finger (a state shown in FIG. 4B).

Note that, parallel to the processing from SA3 to SA8 in FIG. 2, the position detection unit 31 monitors on the basis of an output from the touch panel 10 whether the user's finger lifts from the touch panel 10. If the user's finger lifts from the touch panel 10, the control unit 30 returns at that point to SA1.

III. Effects

According to the present example described above, the moving amount of the image display position is a value that multiples the distance between the position on the image displayed on the display 20 and the finger position on the display 20 by the predetermined coefficient of less than one. Until the moving amount is equal to or less than the minimum moving amount, the image display position is updated in the predetermined cycle by moving the image display position in a direction that heads from the position on the image displayed on the display 20 toward the finger position on the display 20. Therefore, the image display position can be updated so as to track in a delayed manner the movement of the user's finger contacting the touch panel 10. It is thus possible to suppress continued hiding of a specific portion of the displayed image by the user's finger, and improve visibility.

In addition, if the moving direction of the image display position is limited by the display control unit 32 to a specific direction, the display control unit 32 calculates the moving amount of the image display position based on the distance of the component of the specific direction between the position on the image displayed on the display 20 and the finger position on the display 20. Thus, even if the image is scrolled in only the specific direction, it is possible to suppress continued hiding of a specific portion of the displayed image by the user's finger, and improve visibility.

In addition, if the image is a list formed of a plurality of items, the minimum moving amount is the display width or the display height per list item. It is thus possible to prevent the movement of the list stopping with list items cut off at end portions of the display 20.

If the image is a map, the display control unit 32 sets the predetermined coefficient to a value that varies depending on the scale of the map. Therefore, the degree of delay with which the map movement tracks the movement of the user's finger can be adjusted depending on the scale of the map, and visibility further improved. For example, when displaying a wide area map with a high density of display information such as location names and facility names, the map can be moved relatively slowly with respect to the movement of the user's finger. Conversely, when displaying a detailed map with a low density of display information such as location names and facility names, the map can be moved relatively quickly with respect to the movement of the user's finger.

IV. Modifications

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying inventive principles.

For example, the problems to be solved and the resulting effects are not limited to the content described above and may vary depending on the environment in which the inventive principles are implemented and the detailed configuration of the implementation. The above problems may be only partially solved, and the above effects only partially achieved.

According to the example described above, as an example, in the display control process in FIG. 2, each time the position detection unit 31 detects the finger position (SA4), the display control unit 32 updates the display position of the image displayed on the display 20 (SA8). However, the finger position detection cycle and the display cycle for updating the image display position may use different values.

What is claimed is:

1. A display device, comprising:
   a display unit that displays an image;
   a touch panel that is provided on a front surface of the display unit; and
   a controller that:
      detects a start position, which is a detected position where a user's finger starts to contact the touch panel;
      specifies a position on the image corresponding to the detected start position; and
      in a predetermined cycle:
         detects a current position of the user's finger;
         calculates a moving amount by multiplying a distance between a first position that is a position on the display unit corresponding to the specified position on the image and a second position that is a position on the display unit corresponding to the detected current position of the user's finger by a predetermined coefficient of less than one; and
         updates a display position of the image by moving a distance equal to the calculated moving amount in a direction from the first position toward the second position.

2. The display device according to claim 1, wherein the controller:
   when the moving direction of the display position of the image is limited to a specific direction, calculates the moving amount based on a distance of a vector component of a vector between the detected start position and the detected second position.

3. The display device according to claim 2, wherein:
   the image is a list formed of a plurality of items; and
   when the calculated moving amount does not exceed one of a display width and a display height per list item, the controller does not update the display position.

4. The display device according to claim 1, wherein:
   the image is a list formed of a plurality of items; and
   when the calculated moving amount does not exceed one of a display width and a display height per list item, the controller does not update the display position.

5. The display device according to claim 1, wherein:
   the image is a map; and
   the controller sets the predetermined coefficient to a value that varies depending on a scale of the map.

6. A navigation device comprising the display device of claim 1.

7. The display device according to claim 1, wherein the controller:
   determines whether the calculated moving amount is greater than a minimum moving amount; and
   when the calculated moving amount is greater than the minimum moving amount, updates the display position by moving the image the distance equal to the calculated moving amount in the direction from the first position toward the second position.

8. A display method, comprising:
   displaying an image on a display unit;
   providing a touch panel on a front surface of the display unit;
   detecting a start position, which is a detected position where a user's finger starts to contact the touch panel;
   specifying a position on the image corresponding to the detected start position; and
   in a predetermined cycle:
      detecting a current position of the user's finger;
      calculating a moving amount by multiplying a distance between a first position that is a position on the display unit corresponding to the specified position on the image and a second position that is a position on the display unit corresponding to the detected current position of the user's finger by a predetermined coefficient of less than one; and
      updating a display position of the image by moving a distance equal to the calculated moving amount in a direction from the first position toward the second position.

9. The display method according to claim 8, further comprising:
   when the moving direction of the display position of the image is limited to a specific direction, calculating the moving amount based on a distance of a vector component of a vector between the detected start position and the detected second position.

10. The display method according to claim 9, wherein:
    the image is a list formed of a plurality of items; and
    when the calculated moving amount does not exceed one of a display width and a display height per list item, the display position is not updated.

11. The display method according to claim 8, wherein:
the image is a list formed of a plurality of items; and
when the calculated moving amount does not exceed one of a display width and a display height per list item, the display position is not updated.

12. The display method according to claim 8, wherein:
the image is a map; and
the method further comprises setting the predetermined coefficient to a value that varies depending on a scale of the map.

13. The display method according to claim 8, further comprising:
determining whether the calculated moving amount is greater than a minimum moving amount; and
when the calculated moving amount is greater than the minimum moving amount, updating the display position by moving the image the distance equal to the calculated moving amount in the direction from the first position toward the second position.

14. A non-transitory computer-readable storage medium storing a computer-executable display program, the program comprising:
instructions for displaying an image on a display unit;
instructions for providing a touch panel on a front surface of the display unit;
instructions for detecting a start position, which is a detected position where a user's finger starts to contact the touch panel;
instructions for specifying a position on the image corresponding to the detected start position; and
instructions for, in a predetermined cycle:
detecting a current position of the user's finger;
calculating a moving amount by multiplying a distance between a first position that is a position on the display unit corresponding to the specified position on the image and a second position that is a position on the display unit corresponding to the detected current position of the user's finger by a predetermined coefficient of less than one; and
updating a display position of the image by moving a distance equal to the calculated moving amount in a direction from the first position toward the second position.

15. The non-transitory computer-readable storage medium according to claim 14, the program further comprising:
instructions for determining whether the calculated moving amount is greater than a minimum moving amount; and
instructions for, when the calculated moving amount is greater than the minimum moving amount, updating the display position by moving the image the distance equal to the calculated moving amount in the direction from the first position toward the second position.

* * * * *